United States Patent
Petzold et al.

(10) Patent No.: US 7,833,127 B2
(45) Date of Patent: Nov. 16, 2010

(54) METHOD FOR ADJUSTING THE CLUTCH TORQUE OF A MOTOR VEHICLE DEPENDING UPON THE DRIVING RESISTANCE

(75) Inventors: Rainer Petzold, Friedrichshafen (DE); Mario Steinborn, Friedrichshafen (DE); Peter Herter, Ravensburg (DE); Franz Bitzer, Friedrichshafen (DE)

(73) Assignee: Friedrichshafen AG, Friedrichshafen (DE)

( * ) Notice: Subject to any disclaimer, the term of this patent is extended or adjusted under 35 U.S.C. 154(b) by 551 days.

(21) Appl. No.: 11/833,433

(22) Filed: Aug. 3, 2007

(65) Prior Publication Data

US 2008/0039280 A1    Feb. 14, 2008

(30) Foreign Application Priority Data

Aug. 11, 2006    (DE) .................. 10 2006 037 704

(51) Int. Cl.
F16H 59/60    (2006.01)
B60W 10/04    (2006.01)

(52) U.S. Cl. .................. 477/97; 477/107; 477/901

(58) Field of Classification Search .................. 477/83, 477/90, 97, 107, 110, 901
See application file for complete search history.

(56) References Cited

U.S. PATENT DOCUMENTS

| | | | |
|---|---|---|---|
| 4,662,491 A | 5/1987 | Takefuta et al. | |
| 5,549,525 A * | 8/1996 | Wendel | 477/93 |
| 6,626,796 B2 | 9/2003 | Schwab et al. | |
| 6,676,561 B2 | 1/2004 | Fritzer et al. | |
| 6,679,807 B2 | 1/2004 | Kato et al. | |
| 7,041,031 B2 * | 5/2006 | Wheeler et al. | 477/110 |
| 7,099,762 B2 | 8/2006 | Graf et al. | |
| 2002/0084129 A1 | 7/2002 | Fritzer et al. | |
| 2004/0143383 A1 | 7/2004 | Kuepper et al. | |
| 2005/0170933 A1 | 8/2005 | Eriksson et al. | |

FOREIGN PATENT DOCUMENTS

| | | |
|---|---|---|
| DE | 35 16 143 A1 | 11/1985 |
| DE | 38 31 449 A1 | 3/1990 |
| DE | 100 25 882 A1 | 12/2000 |
| DE | 102 03 954 A1 | 9/2002 |
| DE | 10 2004 043 541 A1 | 6/2005 |
| DE | 10 2005 026 472 A1 | 1/2006 |
| DE | 10 2005 021 414 A1 | 11/2006 |
| EP | 1 113 198 A2 | 7/2001 |
| EP | 1 268 231 B1 | 2/2004 |

(Continued)

*Primary Examiner*—Roger Pang
(74) *Attorney, Agent, or Firm*—Davis & Bujold P.L.L.C.

(57) ABSTRACT

A method for controlling or regulating a clutch torque of a startup clutch of a motor vehicle, which first of all reliably prevents an unintentional rolling of the motor vehicle down a gradient and second enables a comfortable maneuvering mode, which requires no separate actuation of an operating element for activating a maneuvering mode, and also enables a precisely dosed speed definition during maneuvering on gradients, wherein the adjusted speed is substantially independent from the gradient of the ground and the motor vehicle load. A startup and maneuvering control device is provided according to the invention, which reads in driving resistance data, determines therefrom a driving resistance value, and determines a base value of the clutch torque of the automated startup clutch in dependence thereof, which is adjusted in dependence upon the accelerator pedal.

14 Claims, 2 Drawing Sheets

FOREIGN PATENT DOCUMENTS

| | | | |
|---|---|---|---|
| FR | 2 824 883 | A1 | 11/2002 |
| WO | WO-00/73516 | A1 | 12/2000 |
| WO | WO-03/041989 | A2 | 5/2003 |
| WO | WO-03/106211 | A1 | 12/2003 |
| WO | 2004005744 | A1 | 1/2004 |

* cited by examiner

METHOD FOR ADJUSTING THE CLUTCH TORQUE OF A MOTOR VEHICLE DEPENDING UPON THE DRIVING RESISTANCE

This application claims priority from German Application Serial No. 10 2006 037 704.4 filed Aug. 11, 2006.

FIELD OF THE INVENTION

The invention concerns a method for adjusting the clutch torque in dependence upon the driving resistance.

BACKGROUND OF THE INVENTION

Automatic clutches have been used for quite some time in the power trains of various motor vehicle types. In particular, a main or startup clutch located between a propulsion engine and a transmission and normally configured as a dry friction clutch, is used to shiftably transfer the torque produced by the propulsion engine to the input shaft of the transmission and enable the startup, particularly with transmissions, with discrete gear ratios. Clutches of this type are referred to as startup clutches.

Since internal combustion engines can only provide a torque, sufficient for the startup, above a certain engine rotational speed; a startup with a slipping clutch is necessary even when starting in the lowest gear of the transmission after the vehicle has been stationary. In fully manually shifted transmissions, the driver, based on his experience, can dose the engine rotational speed and the engine torque and the clutch slip and the torque transmitted by the clutch by actuating the accelerator pedal and the clutch pedal at the same time in such a way that with a slipping clutch initially a driving speed of the vehicle is achieved, which allows the startup clutch to be fully engaged at the selected gear ratio of the transmission. The driver must dynamically adjust the positions of the two pedals in relation to each other, particularly depending upon the driving resistance (startup resistance). With high load and startup processes on steep grades, the driver must considerably depress the accelerator pedal in order to generate a sufficient engine torque for startup on that grade. This engine torque is available at a comparatively high engine rotational speed. The clutch must be engaged slowly to prevent too much torque from being withdrawn from the engine as a result of premature excessive engagement which, due to the inert weight of the vehicle and the very low driving speed of the same, would cause a rapid drop in the engine rotational speed and stalling of the engine.

Semi-automatic, automatic and automated transmissions with corresponding automatically operable or automated startup clutches were developed to relieve the driver from having to perform these complicated control tasks. These are generally designed in such a way that a startup operation is possible with a relatively low clutch load so that overall lower clutch slip during the startup process and relatively early complete engagement of the automated clutch are possible.

Two different operating modes of the motor vehicle should be taken into consideration.

In the startup mode, as explained above, it is desirable to allow the clutch to slip only as long as necessary and reach a driving state with a fully engaged clutch as smoothly as possible.

In the maneuvering mode, the vehicle is supposed to be moved at a very low speed. For this reason, it is generally necessary to allow the clutch to slip for a longer period due to the speed-torque curve of the propulsion engine and the predefined lowest gear ratio. In this case, the startup clutch is fully engaged clearly much more slowly and with considerably greater accelerator pedal deflections than in the startup mode.

With automated clutches, however, it is difficult to determine the driver's true request and adjust the clutch accordingly, simply based on the accelerator pedal position and/or the movement data of the accelerator pedal. Without further provisions, the maneuvering mode range is typically limited to small gears and relatively small accelerator pedal deflections, which make careful and precise maneuvering extremely difficult, particularly when a certain level of pedal deflection of the accelerator pedal is already required for stopping the vehicle on an incline.

In order to increase the deflection range of the accelerator pedal available for maneuvering, it is known to provide a specific increased pedal path of the accelerator pedal for a maneuvering mode, particularly in the lowest forward gear and the reverse gear or the reverse gear with the lowest gear ratio. During a deflection of the accelerator pedal of up to 75% of the maximum deflection, the pressure force of the startup clutch is considerably reduced in these gears in comparison with the startup mode. However, if the driver achieves an accelerator pedal deflection of 75%, as in this case, the startup mode is automatically activated. When the 75% threshold is exceeded in the maneuvering mode, which is frequently critical for safety, this may result in a vehicle behavior that is unexpected for the driver. This is particularly true if, due to unusually high driving resistance as a result of a high load and a steep gradient, no vehicle speed or only a very low vehicle speed was reached by the time this threshold value for the accelerator pedal deflection was reached. In this case, if the driver further deflects the accelerator pedal to end rolling back as quickly as possible, there is an acute risk that as a result he will exceed the threshold for a change into the startup mode and the vehicle will move forward unexpectedly at a comparatively high speed.

A known solution is to explicitly predefine the operating mode of the motor vehicle with the help of input provided by the driver. For this purpose, special shifting elements may be provided in the vehicle. A particularly advantageous solution is known from the previously unpublished application DE 10 2005 021 414 of the Applicant, wherein a sensor element enables the driver to request a maneuvering mode. Other known solutions provide switches with two switch positions for this purpose. However, particularly when maneuvering on gradients, there is a risk that the vehicle will accidentally roll down the gradient or will at least react differently than the driver is accustomed to from standard maneuvering operations on level ground, due to the intentionally reduced pressure force of the startup clutch.

In order to enable a fast actuation of a brake due to the frequently higher risk potential in maneuvering mode, the Applicant discloses a method in EP 1 268 231 B1, wherein a controlled inching procedure of the vehicle is automatically initiated while the gas pedal is not activated following the actuation of a control device. The creeping speed can be predetermine depending upon the activation time or the number of times that the control device was activated.

These solutions make a considerable contribution for simplification of the operation of the vehicle and for an improvement of the safety. However, it is necessary for the driver to remember to actuate the shifting element to set the creeping gear. Furthermore, fixing a preselected speed does not always meet practical requirements in an ideal manner, wherein the speed is increasingly reduced only when approaching a loading ramp or the like. Even if the vehicle speed can be adjusted with the help of the operating element, this process does not correspond to the intuitive speed adjustment, via the accelerator pedal, to which the driver is accustomed.

Overall, it would be desirable if the vehicle behavior, in response to a pedal deflection brought about by the driver, could be decoupled to a greater extent from the factors influencing the driving resistance, which act on the vehicle at that time, particularly the gradient under the vehicle and the load. In this way, a substantially uniform vehicle behavior could be achieved for different operating conditions, thus creating considerably improved comfort and safety for less experienced drivers, particularly during maneuvering procedures.

Under these circumstances, it is the object of the invention to provide a method for controlling or regulating a clutch torque of a startup clutch of a motor vehicle which, first of all, reliably prevents unintentional rolling of the motor vehicle down a grade and, second, enables a comfortable maneuvering mode, which a separate actuation of an operating element is not required, in order to activate the maneuvering mode, and also enables a precisely dosed speed definition when maneuvering on grades, where the resulting vehicle speed is supposed to be substantially independent from the gradient and load.

BRIEF DESCRIPTION OF THE DRAWINGS

The invention will now be described, by way of example, with reference to the accompanying drawings in which.

DETAILED DESCRIPTION OF THE INVENTION

The invention is based on the realization that the current driving resistance is the crucial influencing variable for determining an optimum contact pressure on the friction elements of a startup clutch, as well as for determining the optimum output torque of a propulsion engine and an associated engine rotational speed, in order to define the speed and acceleration of a motor vehicle as best as possible during a maneuvering or startup procedure. Crucial influencing variables for the amount of driving resistance are the current grade of the road and the weight of the vehicle.

Accordingly, the invention is based on a method for adjusting a clutch torque of an automated startup clutch of a motor vehicle. An engine control device is provided for this purpose, which causes a propulsion engine to generate engine torque, while at least taking into consideration a current deflection of an accelerator pedal. Furthermore, a clutch control device is provided, which influences a clutch torque of an automated startup clutch while at least taking into consideration the current deflection of the accelerator pedal. Finally, a transmission with variable gear ratios is provided, which can convert the clutch torque present at a side of the automated startup clutch facing the transmission into a driving torque that can be used to drive the motor vehicle.

The clutch torque shall be understood as the torque present at the clutch output side, which is available for driving the motor vehicle forward after conversion by the transmission. Of course any other variable that has a sufficiently exact known ratio with regard to the clutch torque can be used as a parameter. The clutch torque approximately corresponds to the torque introduced at the transmission input shaft. Taking the transmission gear ratio and optionally the gearing losses into consideration, the torque at the driven wheels of the motor vehicle can alternatively serve as a parameter. Finally, if the engine map or other characteristic data of the propulsion engine are known or if data about activation of the propulsion engine are known and if the correlation between the travel distance of a clutch actuator and the frictional force of the clutch linings developing at the clutch is known, the clutch torque can also be expressed by such variables so that the position of the clutch actuator can, likewise, be used as a parameter instead of the clutch torque. The only crucial aspect is that a variable correlating with clutch torque in a sufficiently known manner is adjusted in such a way that the desired effect is achieved.

The engine control device and the clutch control device may each be configured as separate control devices, which optionally may comprise further control devices or control functions for other devices or assemblies in the vehicle. They may, however, also be integrated in a control device or may be distributed among a plurality of further control devices depending on their functions. Likewise, the mode of operation of the control device, such as electric digital, electric analog, fluid-controlled or mechanically controlled, is entirely irrelevant in the context of the invention.

The term automated startup clutch shall comprise both automatic and automated startup clutches with basically any design, as long as they are shiftable and in a position to operate with a rotational speed difference between the input side and the output side of the startup clutch while simultaneously transmitting torque.

The term accelerator pedal shall be understood more as a control element with respect to the function thereof, which is actuated by a driver to adjust the speed or acceleration of the vehicle. A manual throttle, as it is common in certain construction vehicles and rail vehicles, shall likewise be considered an accelerator pedal within this context.

Figure 1:
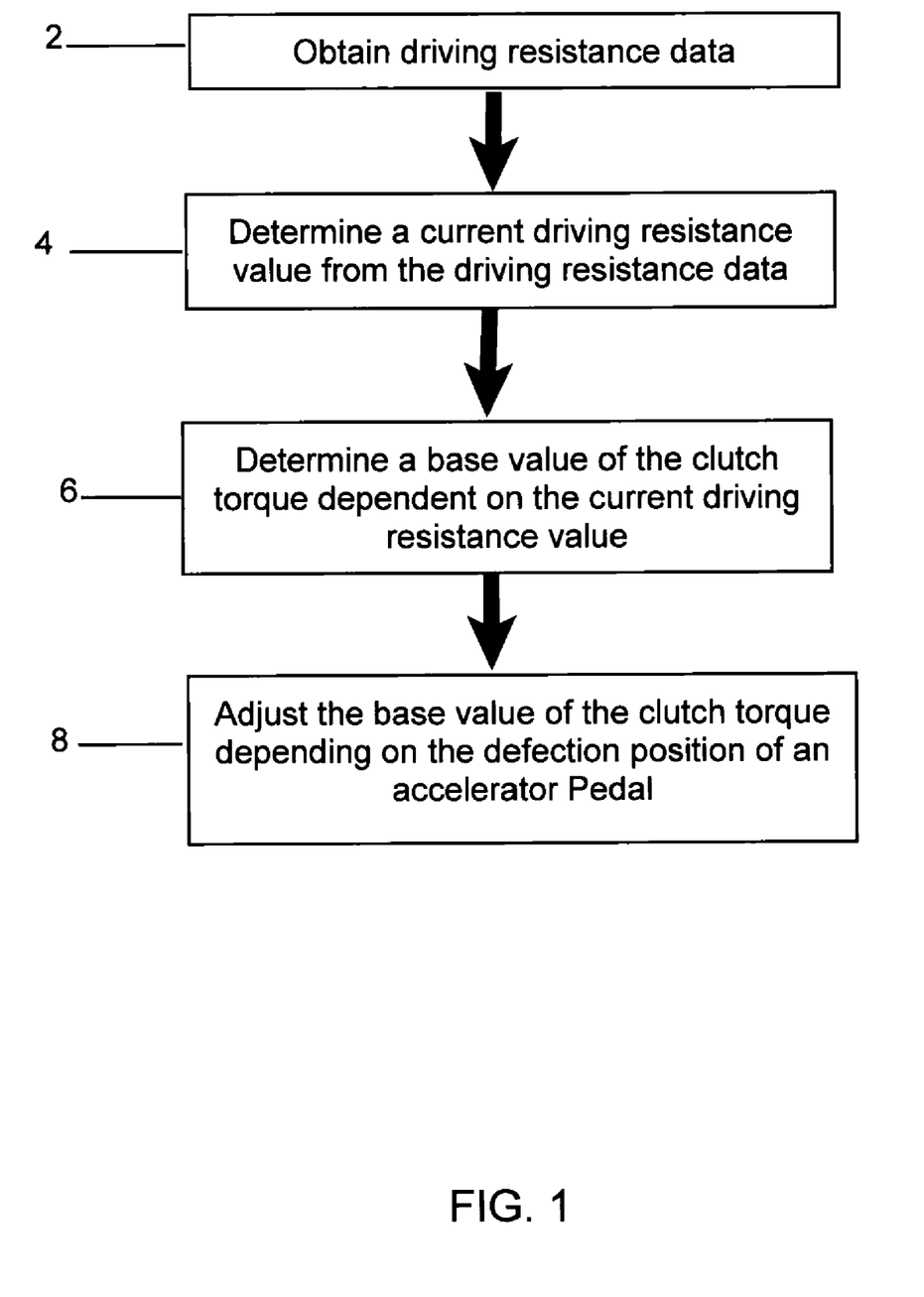
FIG. 1 is a flow diagram showing the start up and maneuvering control device procedure.

As shown in FIG. 1, in order to achieve the object of the invention, a startup and maneuvering control device is provided which reads in driving resistance data, in step 2, determines a driving resistance value therefrom, in step 4, and determines depending thereof a base value of the clutch torque of the automated startup clutch, in step 6, which is adjusted depending upon the deflection position of the accelerator pedal, in step 8.

With respect to possible embodiments of the startup and maneuvering control device, the description provided above with respect to the engine control device and the clutch control device applies accordingly. The driving resistance data shall be understood as data which, either alone or in combination, allow an estimate of the driving resistance, is primarily meant herein the static driving resistance that acts on the vehicle while the vehicle is stationary, due to the grade of the road. In addition to the startup resistance, however, a dynamic portion of the driving resistance can be taken into consideration, which depends primarily on the driving speed of the motor vehicle.

The driving resistance data can be determined directly or indirectly by way of sensors or can be estimated or read with the help of other known data. For example, if the load distribution of the vehicle is known, the grade of the road can be determined, based on the weight, acting on the different axles. If the position and orientation of the vehicle are known by way of GPS data, the current grade can also be read from a memorized digital map. Furthermore, the grade information of a ramp can also be transmitted, via a radio beacon, for example. Further various driving resistance data and possibilities for the detection or estimation thereof are known. Only a few of the central driving resistance data will be addressed in detail within the scope of this description. In principle, the use of other or further driving resistance data falls within the scope of the present invention.

The above-mentioned base value of the clutch torque of the automated driving clutch, which is also adjusted if there is no deflection of the accelerator pedal, can be a correction value in the sense of an offset correction of a startup clutch actuator. In this case, if there is no deflection of the accelerator pedal, the clutch torque is set to a value producing a driving torque on the wheels of the motor vehicle at the selected gear. This torque is just sufficient to prevent the vehicle from rolling down an inclined plane. For the effectiveness of the invention, it does not matter, in principle, in what way this correction value is determined.

The correction value can be determined by way of computations using IT programs, by reading out engine maps, by self-learning processes such as fuzzy logic or other methods. Also insignificant is the manner in which the base value of the clutch torque is transmitted to the clutch. In the practice, it will frequently be advantageous to adjust the clutch base value depending on an actuator position to be adjusted, based on known characteristic values of the clutch that is used. In principle, however, also control circuits are conceivable, which detect the actual clutch torque and control an actuator position accordingly.

Figure 2:
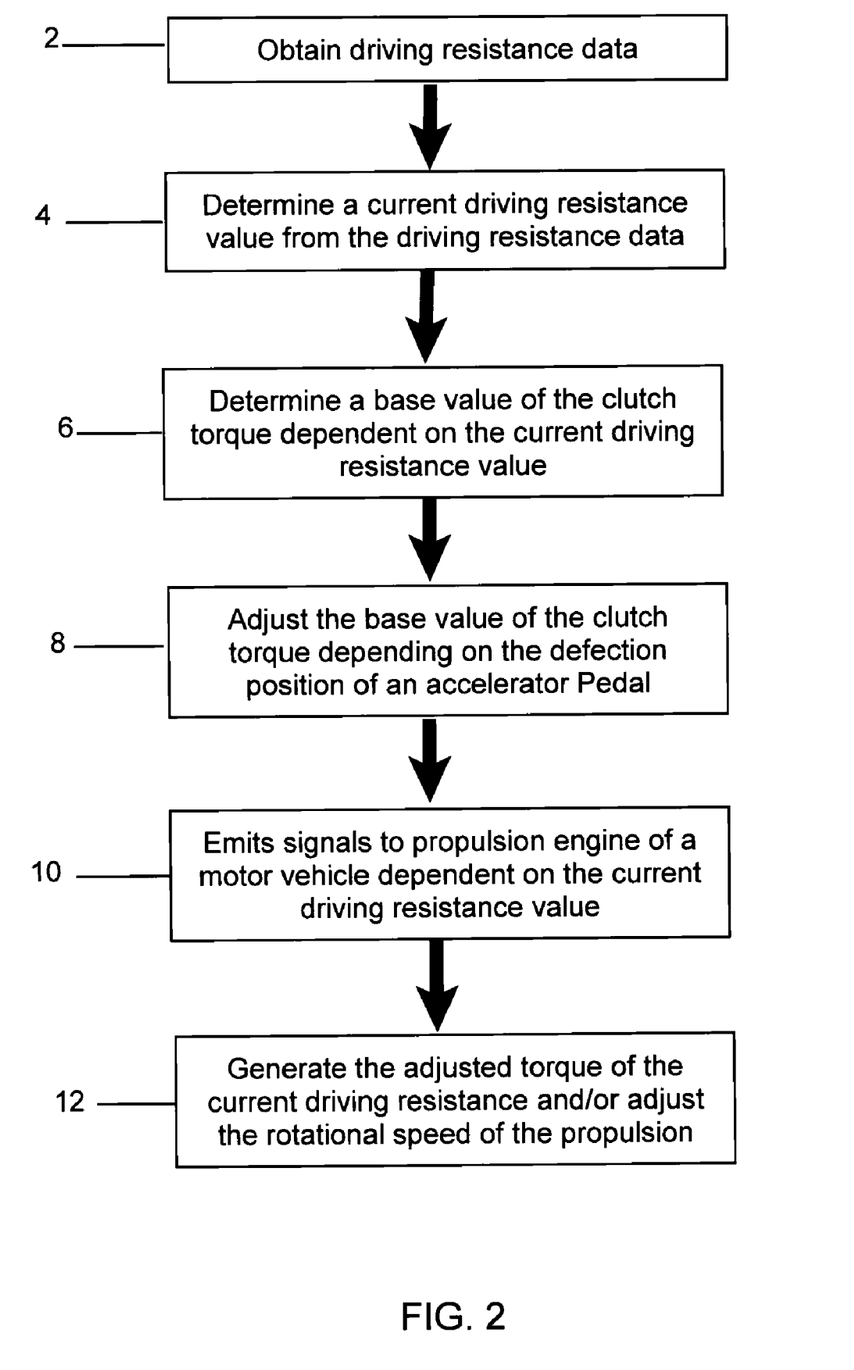
FIG. 2 is a flow diagram showing a variation of the start up and maneuvering control device procedure.

As shown in FIG. 2, if the startup and maneuvering control device, according to the first embodiment of the invention, reads driving resistance data, at step 2, determines a driving resistance value therefrom, at step 4, determines a base value of the clutch torque of the automated startup clutch therefrom, in step 6 and additionally transmits signals to the propulsion engine of the motor vehicle directly in dependence thereof or via the engine control device, in step 10, these signals bringing about the torque to be adjusted to the driving resistance and/or an adjusted rotational speed of the propulsion engine, in step 12, then, even in the case of a relatively high driving resistance, there can always be supplied sufficient engine torque, without having to operate the propulsion engine at unnecessarily high performance values. A simple alternative would be to increase the idle speed during maneuvering mode, which is to say, as soon as certain gear ratios of the transmission have been engaged and the vehicle speed has dropped below a threshold value. This, however, would result in unnecessary high power consumption and increased noise and noxious substance emission.

In any case, it is advantageous if the startup and maneuvering control device at least, at step 2, reads in data about the gradient of the contact surface of the motor vehicle as driving resistance data and takes these data into consideration during the determination of the driving resistance value, in step 4, since these data are supposed to be considered to a particularly great extent, at step 6, in the determination of the base value of the clutch torque in order to prevent the vehicle from accidentally rolling back on a steep grade. Several possibilities for collecting these data have already been mentioned.

Furthermore, during a controlled release of the brakes, it can be determined at what braking pressure value the motor vehicle starts to move. In addition, a variety of other methods are available, which allow conclusions to be made with regard to the gradient of the contact surface of the motor vehicle. For different usage conditions, the gradient of the contact surface can certainly be defined in a number of different ways. For one, the gradient can be determined based on the contact surfaces of the wheels and, if required, taking into consideration the contact forces. In order to minimize the influence of small irregularities of the road, such as a metal threshold of a sliding door, it is also possible to average these values based on time or to determine the grade as a mean, if required, based on the gradient across the length of the motor vehicle or the wheelbase.

Especially in the case of freight transportation vehicles or also buses, because the total weight of these vehicles fluctuates considerably during operation, it is particularly practical if the startup and maneuvering control device at least, in step 2, reads data about the weight of the motor vehicle as driving resistance data and uses the same to determine the driving resistance value, in step 4. While in passenger cars, the provision of a mean total weight may be sufficient in individual cases, but in most cases, at least a consideration of the net weight and additional consideration of weight additions on the basis of signals from the tank level indicator and seat occupation sensors should be sufficient.

As shown by the above example for determining the grade, with the help of the minimum braking pressure required to keep the motor vehicle stationary, it is certainly possible to determine the grade and the weight of the vehicle in the form of a total variable. Other possibilities for determining the weight, however, are also available and useful, particularly if they require no or only little additional effort or expense. Some possibilities include the evaluation of pressure data of a pneumatic shock absorber system, the evaluation of weight-related deflections of parts of the chassis, the input by a driver by way of an adjusting element or automatic determination based on freight documents.

In principle, in most cases, it is sufficient, in step 6, to determine the base value of the clutch torque by only using the lowest forward gear and the lowest reverse gear. In this way, the gear ratio of the transmission can be considered with the help of fixed factors where, of course, further influencing variables, such as different gearing losses based on fluctuating transmission oil temperatures, different wheel diameters of the driven wheels and other factors, can be taken into account to increase accuracy.

If the startup and maneuvering control device, however, reads in data, in step 2, about a power train gear ratio of the motor vehicle as the driving resistance data and uses these, in step 4, to determine the driving resistance value, the base value of the clutch torque can also be easily determined, in step 6, and adjusted for gears with different gear ratios in the same driving direction, thus clearly increasing the possible speed range of the maneuvering operation. This is particularly expedient in connection with a separate request for the maneuvering mode by the driver. In addition, this creates the prerequisite for using the method also in the startup operating mode independent of the reaction of the vehicle in response to the deflection of the accelerator pedal largely from the gradient and load.

It has already been addressed that the gradient and the vehicle weight are crucial influencing variables, in step 4, in determining the driving resistance value, in step 6, for defining the base value of the clutch torque. In a further development, further variables can be considered in addition to these variables. In particular, the startup and maneuvering control device may, in step 2, read in data about the rolling resistance of the motor vehicle as the driving resistance data and use this, in step 4, to determine the driving resistance value. The rolling resistance can be comprised of a static portion, which counteracts the initial rolling of the motor vehicle from standstill and a dynamic portion, which depends on the driving speed of the motor vehicle and can further comprise the rolling resistance value of the tires, losses in the power train and possible aerodynamic resistance values, due to wind speeds and/or the driving speed of the motor vehicle.

A first basic variation of the method provides that the startup and maneuvering control device determine a base value of the clutch torque for the automated startup clutch, in step 6, with the help of the determined driving resistance value, in step 4, wherein the base value brings about an adjusted resulting driving torque on the driven wheels of the motor vehicle, in step 12, even if no deflection of the accelerator pedal occurs, which keeps the vehicle at standstill. As a result, the driver is spared from having to additionally concentrate on preventing the motor vehicle from accidentally rolling away, particularly on grades.

This base value of the clutch torque creates a vehicle reaction to a deflection of the accelerator pedal, wherein this reaction is always the same or at least similar for the driver, since a certain deflection of the accelerator pedal, which varies from one case to another, is not first required to obtain a compensation for the driving resistance. Consequently, also a software threshold for switching from a maneuvering mode to a startup mode can be defined without difficulty for a constant deflection amount, without the occurrence of the problems of insufficient pedal travel after changing to the startup mode, which were initially described.

A second basic variation of the method provides that the startup and maneuvering control device determines a base value of the clutch torque of the automated startup clutch, in step 6, with the help of the determined driving resistance value, in step 4, wherein the base value brings about an adjusted resulting driving torque on the driven wheels of the motor vehicle, in step 12, even if no deflection of the accelerator pedal occurs, which allows the vehicle to roll at a predetermined speed in the normal operating direction of the respectively engaged gear of the transmission. As a result, the driver can define the direction of movement by selecting the gear, can leave his foot on the brake pedal at all times to reduce the response time and can bring about a fine adjustment of the driving speed additionally by way of the driving resistance applied by the brakes.

A further development of this second basic variation provides that the predetermined speed can be adjusted by the driver and/or an automatic system. This appears to be practical, especially in combination with the disclosure of EP 1 268 231 B1 of the Applicant particularly for the adjustment of the maneuvering speed, via the number or duration of applications of an input element by the driver.

Additionally, however, automatic systems are also possible, which automatically predefine the driving speed as a function of the distance to an obstacle, such as a loading ramp. Both vehicle-based systems and vehicle-external systems are possible, which may be installed on a loading ramp and transmit only desired values to the vehicle.

While the method described above can be advantageously used in principle for all conventional transmissions with variable gear ratios, it is particularly useful if the transmission is an automatic or automated transmission with separate gear ratios. Manually shifted transmissions with only one automatic or automated clutch are in principle likewise suited, but automated and automatic transmissions frequently already comprise corresponding control devices and sensors, which can considerably reduce the expenses for implementing the method and, in the ideal case, require only an expansion of the software. While nothing precludes combining the described method with continuously variable transmissions, the advantages in transmissions with separate gear ratios are considerably greater, since they have no alternative mechanisms for implementing a maneuvering mode by way of a slipping clutch.

It was also described before that the weight of the vehicle is an influencing variable crucial for performing the method. Furthermore, maneuvering of passengers cars with centimeter or even millimeter precision is only very rarely required, while it is required relatively frequently for motor vehicles used for transporting goods in order to enable a pallet lifter to drive on the same or fill it using a tank nozzle. Since precise maneuvering additionally becomes more difficult as the vehicle length increases, the method is particularly advantageous when the motor vehicle is a heavy duty truck.

The invention will be explained in more detail hereinafter with reference to an exemplary embodiment.

A heavy truck with a diesel engine as the propulsion engine, an automatic transmission and a dry friction clutch as the startup clutch, located between the diesel engine and the transmission, is to be operated in maneuvering mode according to the method of the invention.

The truck is already equipped with an engine control device, which controls or regulates, among other things, the fuel injection volume and torque produced at a given rotational speed on the basis of an accelerator pedal deflection, caused by the driver, and further input variables. The transmission is, likewise, connected to a transmission control device, which selects and adjusts a suitable gear ratio depending upon the driving speed of the truck, the transmitted torque and the position of the accelerator pedal. The transmission has, for example, two reverse gears and ten forward gears, where the driver can limit the number of gears that can be selected by the transmission controller with the help of a position switch or can select a defined gear by way of a sequential input element.

A maneuvering mode is provided in the lowest two forward gears and the two reverse gears. This means that up to a pedal deflection of approximately 70% of the maximum pedal travel, the transmission controller, which also controls the automated startup clutch, holds the startup clutch within a range in which clutch slippage develops. In this way, the truck can be operated in the selected gear within a speed range in which the diesel engine cannot produce the required output at the rotational speed caused by the fully engaged startup clutch due to the selected gear ratio. In addition, a driving speed is possible in this way that would produce an engine rotational speed below the idle speed with a fully engaged clutch. Furthermore, the vehicle is provided with a sensor, which the driver can use to deactivate the maneuvering mode in the aforementioned four gears and activate the maneuvering mode in higher gears.

In the event that the truck is to be maneuvered with high load on a steep grade without implementing the method according to the invention, the driver would select a suitable (in this case the lowest) forward or reverse gear. While the driver secures the truck initially, by way of a service brake, to prevent the truck from rolling down the grade, he would also have to push down the accelerator pedal so far that the forward driving forces acting on the wheels would at least cancel or exceed the force generated by the grade and the weight of the truck in the direction of the lower ramp edge. The driver can then release the brake and slowly accelerate the vehicle by way of further careful depression of the accelerator pedal. In the plane, even with a maximum allowed load, no more than 20% to 40% of the maximum accelerator pedal deflection is required, which enables a maneuvering mode within a large accelerator pedal range of 20% or 40% to approximately 70%.

On a steep grade, with a high load, without using the method according to the invention, the driver must actuate the accelerator pedal up to approximately 65% of the maximum deflection in order to compensate for the forces produced by the slope of the grade. As soon as he wishes to drive even only slightly faster in the maneuvering mode, he will exceed the 70% threshold of the accelerator pedal deflection, at which point, the transmission controller exits the maneuvering mode and switches to the startup mode, where the startup clutch is fully engaged as quickly as possible to reduce wear. As a result, due to the quickly demanded increasing torque, the engine controller increases the fuel injection volume and the engine torque, while the startup clutch has less and less slippage. The vehicle accelerates with a swiftness that is unexpected for the driver and is in addition jerky.

When using the method, the driving resistance that counteracts the truck on the grade in the direction of the upper end of the ramp is detected and the base position of the startup clutch is automatically adjusted by adjusting the offset or a zero point shift of a clutch actuator in such a way that the driving torque provided by the diesel engine, via the slipping startup clutch and the selected gear ratio, are just barely sufficient to keep the truck on the gradient without additionally using a brake.

In the simplest case, the driver can enter the weight or the actual load of the vehicle with the help of a stepped or continuous input device. This additionally provides the driver in a simple manner with the option of arbitrarily adjusting the vehicle weight to be considered, which will then not correspond to the actual vehicle weight and ensures that, while the accelerator pedal is not deflected, the vehicle on a grade moves slowly in the direction of the upper or lower side of the ramp or grade.

The grade can be detected from a change of the axle load with regard to an axle load on a level road. It is also possible to use any other desired methods or to automatically transmit the grade on loading ramps to the truck via a radio beacon. In a particularly elegant embodiment, the driving resistance data, of step 2, can be determined by automatically and specifically reducing the operating pressure of the service brake until the vehicle is just barely set into motion, while the startup clutch is fully disengaged or a neutral position of the transmission is set. In this way, the static driving resistance data can be determined, in step 2, directly from the known braking pressure or it can at least be estimated with sufficient accuracy.

The driver can keep the truck stationary on the grade during maneuvering, even without actuating a brake, by setting the base value of the startup clutch accordingly. Once the driver actuates the accelerator pedal, even in the case of smaller deflections, a resulting forward driving force is produced for the vehicle resulting in the driver having the entire 70% of the maximum pedal travel available for maneuvering, thus allowing delicate maneuvering. Furthermore, the vehicle always responds substantially in line with the deflection of the accelerator pedal regardless of the grade.

Since it can be assumed that the value of 70% of the maximum pedal travel mentioned, by way of example, will generally not be fully utilized, the driver will not be surprised if the controller switches from the maneuvering mode to the startup mode after this deflection travel has been exceeded.

The advantages of the method can also be utilized if the maneuvering mode is predetermined and fixed, by way of a manual input by the driver or if the vehicle is in the startup mode.

The invention claimed is:

1. A method for adjusting a clutch torque of an automated startup clutch of a motor vehicle having an engine control device which activates a propulsion engine to generate engine torque while taking into consideration at least a current deflection position of an accelerator pedal, a clutch control device influences the clutch torque of the automated startup clutch while taking into consideration at least the current deflection position of the accelerator pedal, and a transmission with multiple gear ratios, capable of converting the engine torque, present at a side of the automated startup clutch coupled to the transmission, into a transmission output torque that is capable of driving the motor vehicle, the method comprising the steps of:
   providing a startup and maneuvering control device which obtains driving resistance data;
   determining, via the startup and maneuvering control device, a current driving resistance value based on the driving resistance data;
   providing an available predetermined range of accelerator pedal deflection for a maneuvering mode;
   determining, for any accelerator pedal deflection within the predetermined range of the accelerator pedal deflection for a maneuvering mode, a base value of the clutch torque of the automated startup clutch depending on current driving resistance value;
   adjusting the base value of the clutch torque depending on the current deflection position of the accelerator pedal due to any accelerator pedal deflection within the predetermined range of the accelerator pedal deflection in the maneuvering mode;
   switching from the maneuvering mode to a startup mode once the predetermined range of the accelerator pedal deflection is exceeded, wherein the startup clutch is fully engaged as quickly as possible to reduce wear.

2. The method according to claim 1, further comprising the steps of:
   obtaining the driving resistance data with the startup and maneuvering control device;
   determining a driving resistance value with the startup and maneuvering control device based on the driving resistance data;
   emitting signals by one of either directly and via the engine control device to the propulsion engine of the motor vehicle depending on the driving resistance value;
   generating, with the propulsion engine, at least one of an adjusted torque, that is adjusted to the current driving resistance, and an adjusted rotational speed of the propulsion engine.

3. The method according to claim 1, further comprising the step of considering a gradient of a contact surface of the motor vehicle, obtained by the startup and maneuvering control device, as the driving resistance data during the determination of the driving resistance value.

4. The method according to claim 1, further comprising the step of considering a weight of the motor vehicle, obtained by the startup and maneuvering control device, as the driving resistance data during the determination of the driving resistance value.

5. The method according to claim 1, further comprising the step of considering a power train gear ratio of the motor vehicle, obtained by the startup and maneuvering control device, as the driving resistance data during the determination of the driving resistance value.

6. The method according to claim 1, further comprising the step of considering data about a rolling resistance of the motor vehicle, obtained by the startup and maneuvering control device, as the driving resistance data during the determination of the driving resistance value.

7. The method according to claim 1, further comprising the step of determining the base value of the clutch torque of the automated startup clutch, giving consideration to the determined driving resistance, which generates an adjusted resulting driving torque on the driven wheels of the motor vehicle, even if the accelerator pedal is not deflected, to keep the vehicle stationary.

8. The method of according to claim 1, further comprising the step of determining the base value of the clutch torque of the automated startup clutch, giving consideration to the determined driving resistance, which generates an adjusted resulting driving torque on the driven wheels of the motor vehicle even if the accelerator pedal is not deflected, to allow the vehicle to roll at a predetermined speed in a normal operating direction of a respectively engaged gear of the transmission.

9. The method according to claim 8, further comprising the step of allowing at least one of driver and an automatic system to adjust the predetermined speed.

10. The method according to claim 1, further comprising the step of providing one of an automatic transmission and an automated transmission, having separate gear ratios, as the transmission.

11. The method according to claim 1, further comprising the step of using, as the motor vehicle, a vehicle which is suitable for transporting one of goods and people.

12. The method according to claim 1, further comprising the step of using a truck as the motor vehicle.

13. A method of adjusting an output torque of an automated clutch of a motor vehicle, the method comprising the steps of:
    activating a propulsion engine with an engine control device, depending on at least an accelerator pedal deflection position, to generate an engine output torque;
    collecting driving resistance data with a startup and maneuvering control device;
    determining a driving resistance value from the collected driving resistance data;
    controlling the propulsion engine, with the engine control device, depending on the driving resistance value to generate an adjusted output torque of the automated clutch;
    providing an available predetermined range of accelerator pedal defection for a maneuvering mode;
    determining, for any accelerator pedal deflection within the predetermined range of the accelerator pedal deflection for a maneuvering mode, a base value of the clutch torque of the automated clutch depending on the collected driving resistance data;
    adjusting the base value of the clutch torque of the automated clutch depending on at least the accelerator pedal deflection position due to any accelerator pedal deflection within the predetermined range of the accelerator pedal deflection in the maneuvering mode;
    regulating the output torque of the automated clutch, with a clutch control device, depending on at least one of the accelerator pedal deflection position and the base value;
    converting the output torque of the automated clutch, with a transmission having multiple gear ratios, into a transmission output torque to drive the motor vehicle;
    switching from the maneuvering mode to a startup mode once the predetermined range of the accelerator pedal deflection is exceeded, wherein the startup clutch is fully engaged as quickly as possible to reduce wear.

14. The method according to claim 13, further comprising the step of defining the driving resistance data as at least one of a gradient of a contact surface of the motor vehicle, a weight of the motor vehicle, a power train gear ratio of the motor vehicle and rolling resistance data of the motor vehicle.

* * * * *

UNITED STATES PATENT AND TRADEMARK OFFICE
CERTIFICATE OF CORRECTION

PATENT NO. : 7,833,127 B2
APPLICATION NO. : 11/833433
DATED : November 16, 2010
INVENTOR(S) : Rainer Petzold et al.

It is certified that error appears in the above-identified patent and that said Letters Patent is hereby corrected as shown below:

On the cover page of the US Patent the Assignee is:

(73) Assignee: Friedrichshafen AG, Friedrichshafen (DE)

when it should be:

(73) Assignee: ZF Friedrichshafen AG, Friedrichshafen (DE)

Signed and Sealed this
Nineteenth Day of July, 2011

David J. Kappos
*Director of the United States Patent and Trademark Office*